Aug. 5, 1969  J. R. LAND ET AL  3,459,354

WHEEL MOUNTING STRUCTURE

Filed March 8, 1966  4 Sheets-Sheet 1

INVENTORS
JOHN R. LAND
FORREST C. PITTMAN

BY
ATTORNEYS

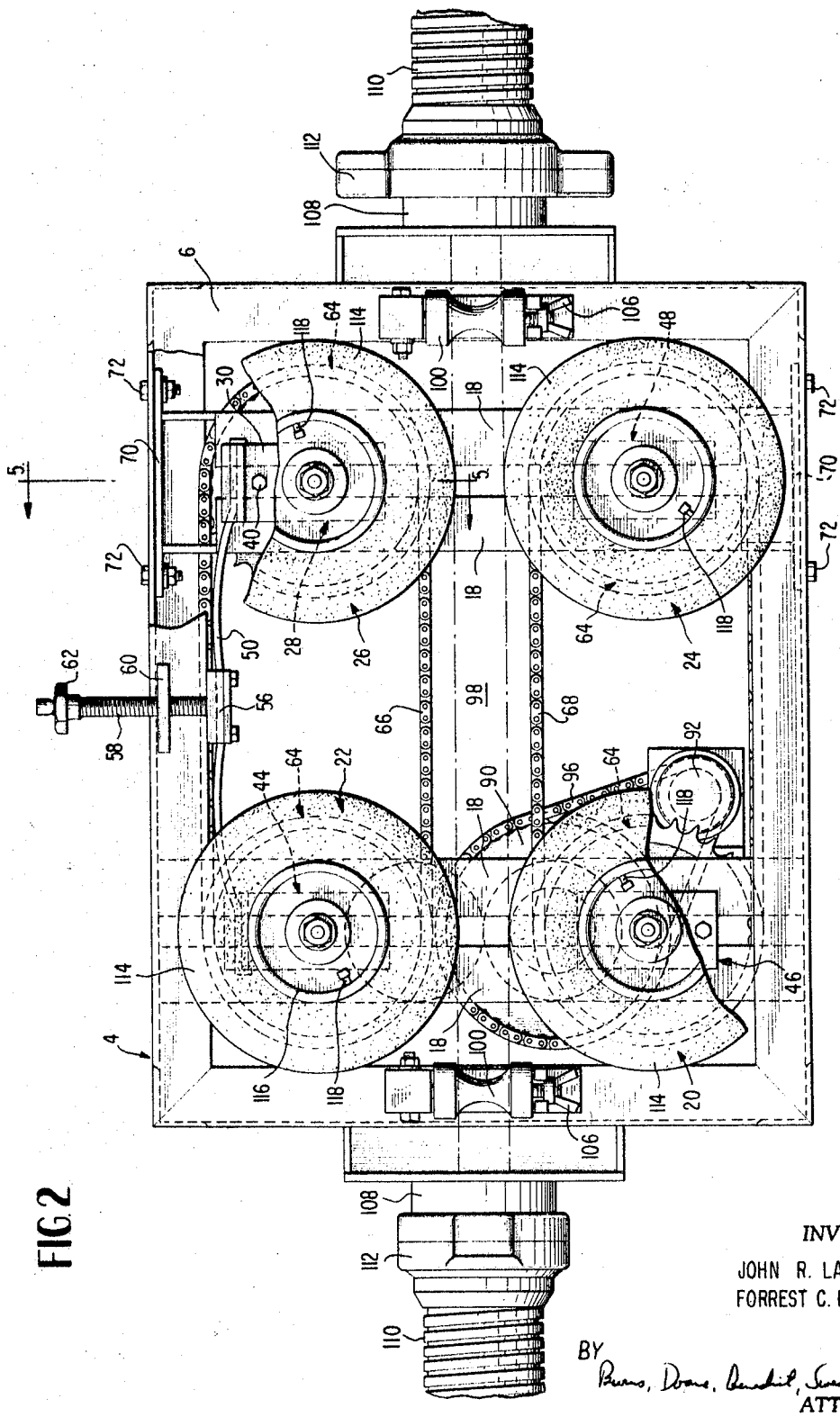

Aug. 5, 1969  J. R. LAND ET AL  3,459,354
WHEEL MOUNTING STRUCTURE
Filed March 8, 1966  4 Sheets-Sheet 3
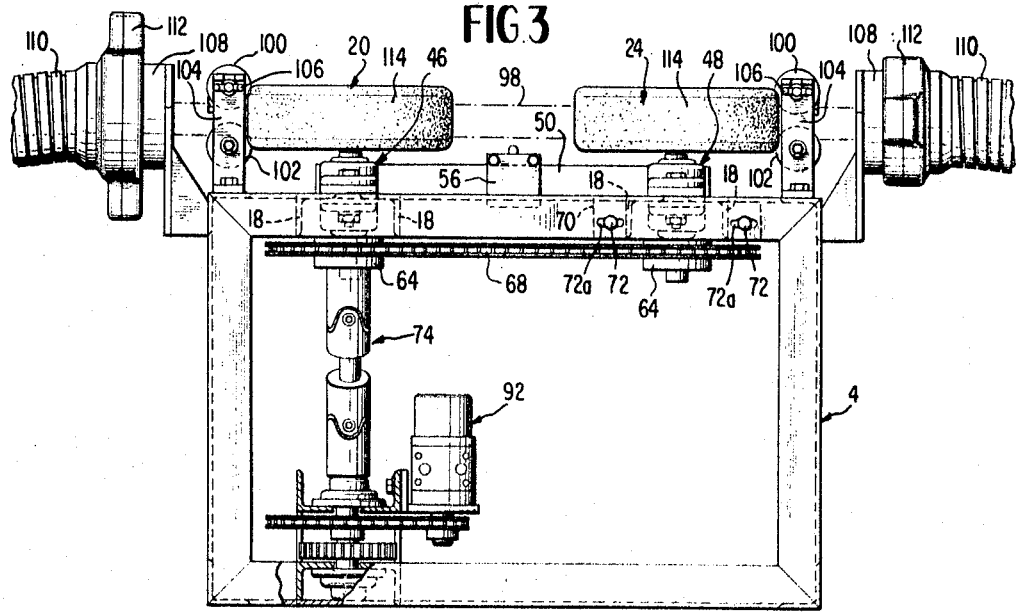
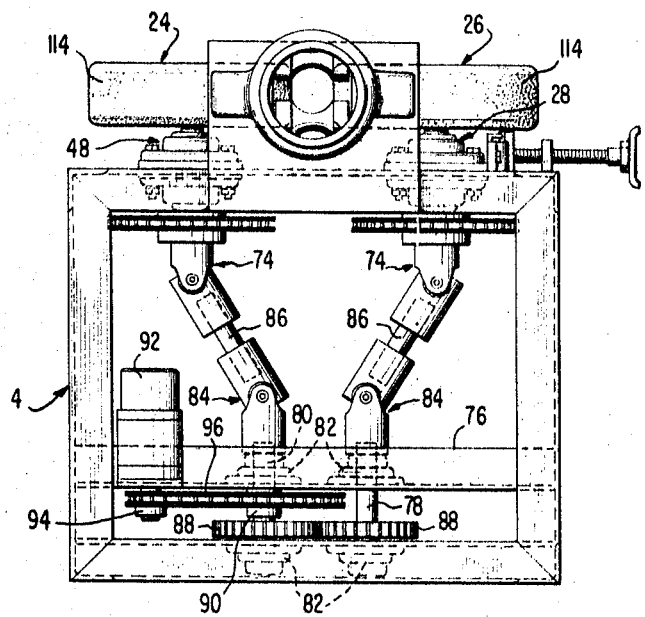
INVENTORS
JOHN R. LAND
FORREST C. PITTMAN
BY *Burns, Doane, Benedict, Swecker & Mathis*
ATTORNEYS United States Patent Office 3,459,354
Patented Aug. 5, 1969

3,459,354
WHEEL MOUNTING STRUCTURE
John R. Land and Forrest C. Pittman, Duncan, Okla., assignors to Halliburton Company, Duncan, Okla., a corporation of Delaware
Filed Mar. 8, 1966, Ser. No. 532,739
Int. Cl. B65h 17/22
U.S. Cl. 226—177                    4 Claims

ABSTRACT OF THE DISCLOSURE

Apparatus for pushing and pulling hoses, cables, and similar flexible elongated articles in an axial direction. The apparatus includes pairs of opposed wheels mounted on a frame in substantially coplanar relation with the central axis of the wheels in substantially parallel relation. The wheels are provided with inflated tires with the tread of the tires forming gripping surfaces for engaging the elongated article being conveyed. One wheel of each pair is mounted for rotation on a bearing fixed to the frame, while the other wheel is mounted for rotation on a bearing that is guided for movement toward and away from the opposed wheel, and a common spring connects the movable bearings of adjacent pairs of wheels with the machine frame. Power for driving the wheels is transmitted to the movable wheels by a pair of universal joints and a sliding, splined coupling which allows movement of the wheel relative to the frame without interrupting transmission of power to the wheels.

---

This invention relates to the conveying of elongated articles and more particulraly to apparatus for pushing and pulling hoses, cables, tubing and similar elongated articles in an axial direction.

Elongated articles, such as cables, hoses and tubing, are awkward to handle manually. When very little axial force is required, a cable or conduit may be grasped manually along its length, but if it should become necessary to apply a relatively large axial force, manual handling is often ineffective. For example, in order to overcome an obstruction in a pipe through which the cable or conduit is being threaded, it may be necessary to exert a strong pushing or pulling force to release the cable or conduit.

This is a particular problem when advancing hoses that contain fluid under high pressure. A rope may be tied around the hose, and the hose may be advanced by pulling on the rope. As the hose advances, however, it would be necessary to move the rope along the hose. These is, also the danger of the hose rupturing at the point where the rope is tied to the hose. If the pressurized hose should become ruptured, the fluid could cause serious injuries to the workmen.

One example of a situation where it is necessary to apply an axial force to a hose containing pressurized fluid is in the cleaning of underground pipes. A spray head or nozzle on the end of the high pressure hose erodes the scale and sediment on the interior surface of the pipe as the hose moves through the pipe. The hose is flexible to accommodate bends in the pipe. If the nozzle head engages an obstruction in the pipe, it is necessary to apply an axial force to the hose to remove the obstruction. Also, if there are bends in the pipe, a substantial axial force may be required to overcome the frictional resistance of the pipe.

Accordingly, it is an object of this invention to provide improved apparatus for conveying hoses, conduits, tubing and similar elongated articles.

It is a further object of this invention to provide apparatus for pushing and pulling hoses, cables and conduits in an axial direction.

Another object of this invention is to provide apparatus for conveying hoses, cables and conduits which is safely and easily operated.

These objects are accomplished in accordance with a preferred embodiment of the invention by a frame having opposed wheels mounted on the frame for receiving elongated articles between the wheels. Preferably, a plurality of pairs of opposed wheels are mounted for rotation on a common frame, and hoses, cables or conduits pass between the opposed peripheral gripping surfaces of each pair of wheels. Each wheel includes an inflated tire and the tire tread forms the gripping surface. The separation between the wheels of each opposed pair may be adjusted to accommodate hoses and cables of different sizes, and the gripping surface area of the tire that contacts the hose or cable may be adjusted by changing the inflation pressure of the tire. Means are provided at each end of the frame for guiding the hose or cable between the wheels. A motor drives the wheels for conveying the hose or cable in one direction across the frame. By reversing the motor, the hose or cable is conveyed in the opposite direction.

This preferred embodiment is illustrated in the accompanying drawings in which:

FIG. 2 is a top plan view of the apparatus with the cover removed;

FIG. 3 is a side elevational view of the apparatus;

FIG. 4 is an end elevational view of the apparatus;

Figure 1:
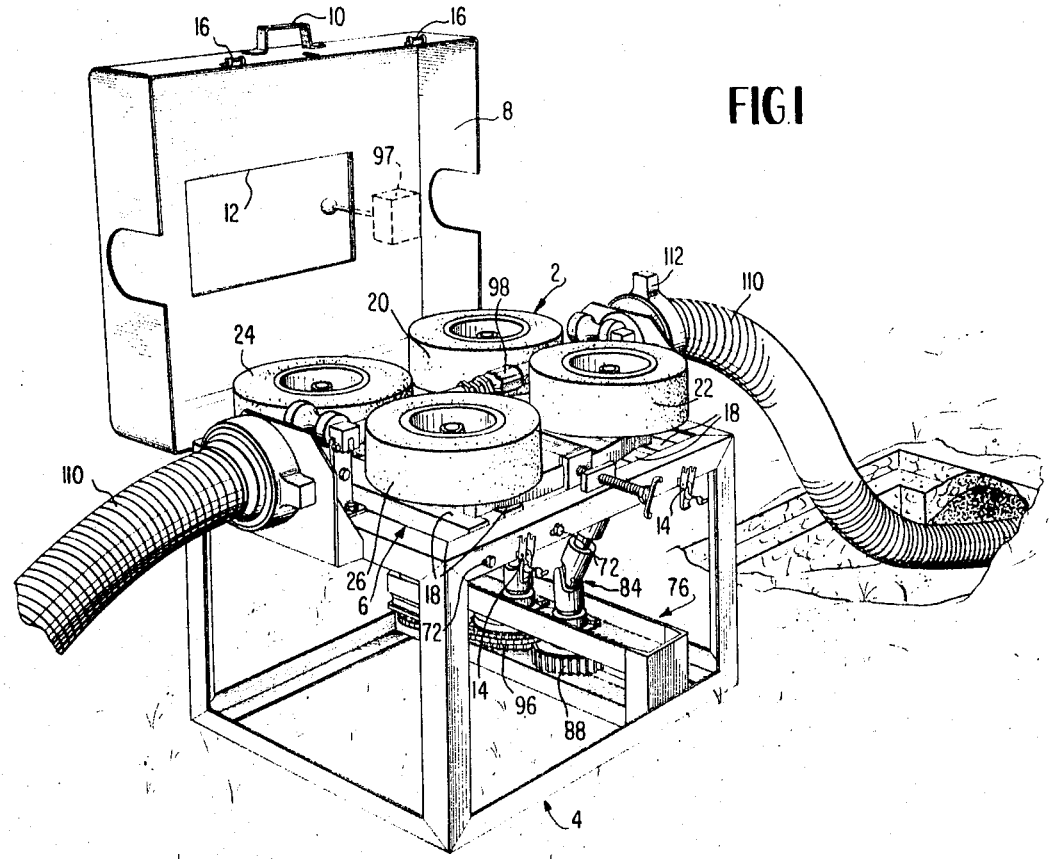
FIG. 1 is a perspective view of the apparatus of this invention.

Referring to FIG. 1, the conveying apparatus 2 includes a frame 4. The frame 4 has a supporting surface, generally indicated at 6, and a cover 8 is hingedly mounted at one side of the surface 6 for vertical swinging movement relative to the surface 6. The cover 8 has a handle 10 to facilitate movement of the cover and has an opening 12 to observe the progress of conduits or similar articles that are conveyed across the supporting surface 6. The cover 8 may be locked in closed position by means of latches 14 on the frame 4, which engage brackets 16 on the cover.

The supporting surface 6 includes a plurality of transverse bars 18 which are secured at their opposite ends to the frame 4. The bars 18 are preferably formed of structural angle bars and are arranged with adjacent sides in substantially parallel relation, as shown in FIG. 3. The parallel sides of the bars 18 support bearing assemblies for each of the wheels 20, 22, 24 and 26 that are mounted above the supporting surface 6.

Figure 5:
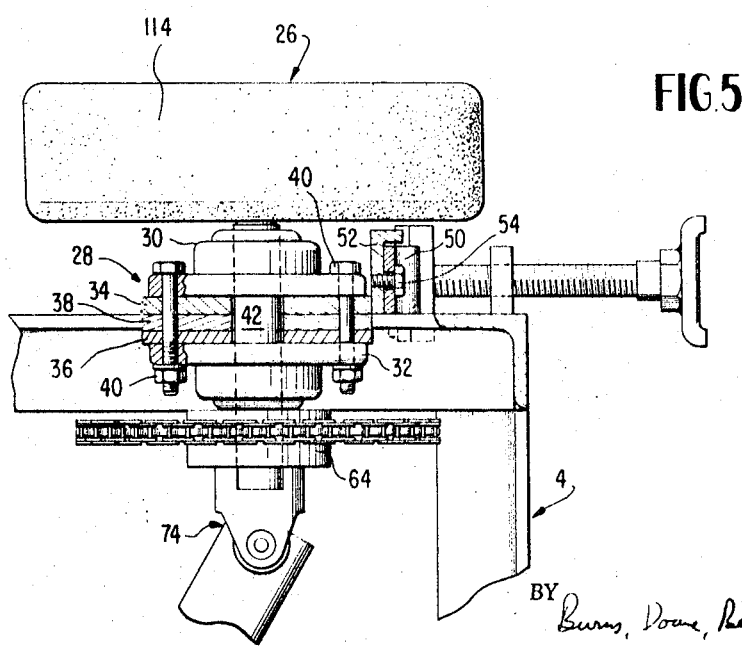
FIG. 5 is a detail cross-sectional view of the apparatus along the line 5—5 in FIG. 2.

The bearing assembly 28 for the wheel 26 is shown in FIG. 2, 4 and 5. The bearing assembly 28 includes upper and lower bearing blocks 30 and 32, upper and lower sliding plates 34 and 36, and a spacer plate 38, which are clamped together by a pair of bolts 40. The sliding plate 34 is supported on the upper surfaces of the bars 18 and the lower sliding plate 36 is substantially coextensive with the upper plate 34. The spacer 38 is positioned in the slot between the edges of the bars 18. The bolts 40 extend through the slot, the plates 34 and 36, and the spacer 38. The thickness of the spacer 38 is slightly greater than the thickness of the sides of the angle bar 18, so that there is sufficient clearance between the bars 18 and the sliding plates 34 and 36 to permit the bearing assembly to move axialy along the slot between the bars. An axle 42 extends through the bearing blocks 30 and 32 and through aligned holes in the plates 34, 36, and the spacer 38, and the wheel 26 is mounted on the axle 42.

Another bearing assembly 44 that is substantially identical to the bearing assembly 28 is mounted on the other pair of bars 18 for supporting the wheel 22 for rotation, as shown in FIG. 2. The bearinga ssembly 44 is movable between the bars 18 in the same manner as the bearing assembly 28. Bearing assemblies 46 and 48 are also provided for supporting the wheels 20 and 24, respectively. The bearing assemblies 46 and 48 are substantially identical to the bearing assemblies 28 and 44, except that the spacer plate 38, as shown in FIG. 5, is eliminated. Consequently, the sliding plates 34 and 36 are clamped tightly against the sides of the bars 18 by the bolts 40. In this manner the position of each wheel 20 and 24 is fixed with respect to the frame 4. The positions of the wheels 20 and 24 may be adjusted, however, by loosening the bolts 40 and sliding the bearing assemblies 46 and 48 along the bars 18.

The movable bearing assemblies 28 and 44 are biased toward the stationary bearing assemblies 46 and 48 by a spring 50. One end of the spring 50 is secured to an upright projection 52 on the upper sliding plate 34 by means of a screw 54. The opposite end of the spring 50 is secured in a similar manner to the bearing assembly 44. The spring 50 is preferably bowed and has an adapter plate 56 mounted at the center of the spring, shown in FIG. 2. An adjusting screw 58 extends through an upright block 60 on the frame 4 and the end of the screw 58 bears against the adapter 56. By turning the handle 62 on the screw 58, the position of the adapter 56 relative to the block 60 may be adjusted, thereby adjusting the force of the spring 50 urging the bearing assemblies 28 and 44 toward the opposing wheels 24 and 20 respectively.

Each of the wheel axles 42 has a sprocket wheel 64 secured on the axle. The sprocket wheels of the front pair of wheels 22 and 26 are connected together by a sprocket chain 66, and the rear pair of wheels 20 and 24 are connected together by a sprocket chain 68. In order to adjust the tension in the chains 66 and 68, the bars 18 supporting the wheels 24 and 26 are mounted for sliding movement relative to the frame 4, as shown in FIGS. 2 and 3. The opposite ends of the bars 18 are secured to a plate 70 by welding or other suitable means, so that the width of the slot between the bars 18 remains fixed. The plate 70 at each end of the bars 18 is secured to the frame 4 by bolts 72 which extend through slots 72A in the frame. The slots 72A are provided in the frame 4 to allow the plate 70 to be displaced toward and away from the other pair of supporting bars 18.

The axles 42 supporting the wheels 20 and 22 each have a tubular extension on the sprocket wheel 64 which forms one leg of a universal joint 74. At the bottom of the frame 4, under the wheels 20 and 22, a subframe 76 is rigidly mounted in the frame 4. Gear shafts 78 and 80 (FIG. 4) are journaled in bearing blocks which are fastened to the subframe 76. Universal joints 84 are secured to the respective shafts 78 and 80 and universal joints 74 and 84 are each joined together by a shaft 86. Each of the shafts 86 is restricted from rotating relative to the universal joints 74 and 84, but is not restricted from longitudinal movement with respect to the universal joints. For example, the shafts 86 may be splined shafts.

Each of the gear shafts 78 and 80 is provided with a spur gear 88 of substantially the same diameter and a sprocket wheel 90 is mounted on the shaft 80. A motor 92 is also mounted on the subframe 76 and the shaft of the motor drives a sprocket wheel 94. A sprocket chain 96 extends between the sprocket wheels 90 and 94 for driving the gear shaft 80 in one direction and driving the other shaft 78 through the gears 88 in the opposite direction. Consequently, the motor 92 drives the wheels 20 and 24 which are connected together by the sprocket chain 68 in one direction and the wheels 22 and 26 which are connected together by the sprocket chain 66 in the opposite direction.

The motor 92 may be either a reversible electric motor or a reversible hydraulic motor. The motor controls 97 are preferably mounted on the outside of the cover 8, where they are readily accessible to the operator.

An elongated article in the form of a hose 98 having couplings at spaced intervals is shown in FIG. 1, and is represented schematically in FIGS. 2 and 3. The hose 98 is guided between the wheels 20, 22, 24 and 26 by a pair of guide rollers 100 and 102 at each end of the frame 4. The rollers 100 and 102 are mounted in an upright frame 104. The upper roller 100 of each pair is hingedly mounted at one end to permit vertical swinging movement of the roller. The oopsite end of each upper roller 100 has a threaded portion which cooperates with a wing nut 106. When the nut 106 is tightened against the frame 104, the roller 100 is fixed in position for supporting the hose 98 as it passes across the top of the frame 4.

A collar assembly 108 is mounted at each opposite end of the frame 4 adjacent the roller frame 104, with the central axis of the collar 108 being approximately centrally located with respect to the space between the rollers 100 and 102. A flexible tube 110 is releasably fastened to each collar 108 by a coupling 112. The coupling 112 may be of any conventional construction, and for exmple, may have inernal threads cooperating with external threads on the collar 108. The flexible tubes 110 guide the hose 98 toward and away from the supporting surface 6 of the frame 4.

Each of the wheels 20, 22, 24 and 26 includes an inflated tire 114 and a rim 116 on which the tire is mounted. The tire 114 of each wheel may be inflated through a valve 118. Preferably, the tread of each tire 114 is approximately cylindrical when it is not in engagement with the hose 98. Also, the side walls of the tires should be reasonably straight. A tire of this configuration has a greater resistance at the side wall to an inwardly directed radial force, than it does at the portion of the tread midway between the side walls. As the hose 98 passes between the pairs of wheels 24 and 26 and 20 and 22, the tread portion of each tire that engages the hose 98 deflects inwardly to the greatest extent midway across the width of the tread and thus tends to maintain the hose substantially centered on the tread of the tires as it passes between each pair of tires.

In operation, the cover 8 is opened to expose the wheels 20, 22, 24 and 26. The separation between each of the pairs of wheels is adjusted by turning the handle 62 and by loosening the bolts 40 on the bearing assemblies of the wheels 20 and 24, if necessary, until the space between the wheels is sufficiently wide to receive the hose 98. The wing nuts 106 on the upper rollers 100 at each end of the frame are unscrewed and the upper rollers are then free to swing upwardly out of the way. The hose 98 is inserted in one of the flexible tubes 110 from the end opposite the coupling 112. The hose 98 is then brought through the guide roller frame 104, between both pairs of wheels 20 and 22, and 24 and 26, and then through the other guide roller frame 104 and into the flexible tube 110 at the opposite end of the machine. Both guide rollers 100 are then locked in the position shown in FIG. 2 by tightening the ring nuts 106. In the arrangement shown in FIG. 1, the left hand tube 110 extends toward a reel or other means for dispensing the hose, and the right hand tube 110 is inserted in the end of a sewer pipe through which the hose is to be run.

The force of the spring 50 displaces the tires 114 of the wheels 22 and 26 into engagement with the tube 98. Depending upon the diameter of the hose 98, it may be necessary to adjust the positions of the wheels 20 and 24 relative to the bars 18 before adjusting the positions of the other wheels 22 and 26. This may be accomplished by unscrewing the bolts 40 sufficiently to allow the bearing assemblies 46 and 48 to slide along their respective supporting bars 18. When they are at the desired position, the bolts may then be tightened to clamp the bearing assemblies against the bars 18. The position of the spring 50 may also be adjusted by turning the handle 62 of the screw 58. Preferably, the positions of the various wheels are adjusted until all of the tires 114 have approximately the same deflection at the center of the tread where they engage the hose 98.

When these adjustments have been completed, the cover 8 is closed and the motor 92 is turned on by operating the controls 97. The motor 92 rotates the gear shafts 78 and 80 in opposite directions, and this rotary motion is transmitted to the wheels 20 and 24 which turn in one direction and to the wheels 22 and 26 which turn in the opposite direction. The frictional engagement of the tires 114 with the hose 98 causes the hose 98 to move axially relative to the frame 4. The gripping action of the tires may be improved by increasing the force of the spring 50 that urges the movable wheels 22 and 26 against the hose. Also, the internal tire pressure may be reduced in order to increase the deflection of the tire tread and thereby increase the area of contact between the tires and the hose. The catenary profile of the tire treads tends to cause the hose to remain centered between the opposed tires regardless of whether the supporting surface 6 of the apparatus 2 is vertical or horizontal.

While the machine is being operated, the cover 8 is closed and secured by the latches 14 which cooperate with the bracket 16 on the cover. The progress of the hose 98 may be observed through the window opening 12. Since the hose 98 normally carries high pressure fluid, the operator is protected by the cover 8 if the hose should break as it passes across the top surface of the frame 4.

Figure 6:
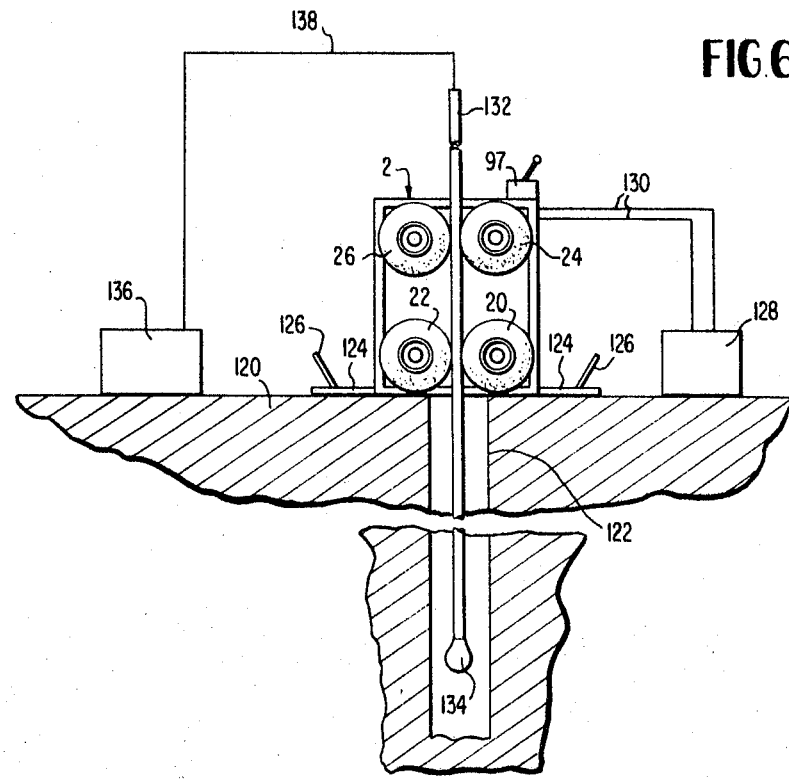
FIG. 6 is a schematic view of the apparatus as used in a grouting operation.

The apparatus 2 may be used for running pipe in a bore hole for grouting operations, as shown schematically in FIG. 6. One end of the frame is placed on the surface of the ground 120. The flexible tubes 110 have been removed from the collar 108 and the frame is secured in position over a bore hole 122 by outwardly extending pads 124 which are anchored to the ground by spikes 126. A portable hydraulic pump 128 is positioned adjacent the apparatus 2 and hydraulic fluid under pressure is circulated from a pump 128 through conduits 130 to the motor 92. The direction of flow of fluid to the motor may be reversed by operating the controls 97.

In a grouting operation, it is sometimes necessary to wash a pipe down in a hole through sediment and cuttings to reach the desired depth. A pipe 132 having a nozzle 134 at its lower end is positioned between the wheels 20, 22, 24 and 26 and suspended in the hole 122. A pump 136 supplies fluid to the pipe 132 under pressure through a flexible conduit 138. The pipe 132 is driven through the sediment by repeatedly reversing the direction of rotation of the wheels 20, 22, 24 and 26 to cause the pipe 132 to reciprocate through short intervals.

In operation, the fluid is pumped out through the nozzle 134 at the bottom of the pipe 132 to wash away the sediment and, at the same time, the wheels 20, 22, 24 and 26 are rotating in a direction to drive the pipe down into the hole. Periodically, the controls 97 are reversed to cause the wheels 20, 22, 24 and 26 to rotate in the opposite direction and to lift the pipe 132 a short interval. The operation is repeated merely by reversing the position of the controls 97. The reciprocating action of the pipe 134 and the wash of the fluid flowing out of the nozzle 132 cause the pipe to settle downwardly through the sediment. The wheels 20, 22, 24 and 26 not only reverse the direction of the thrust on the pipe, but also feed the pipe downwardly into the hole. After the completion of the grouting operation, the apparatus 2 may be readily moved to the next site.

Figure 7:
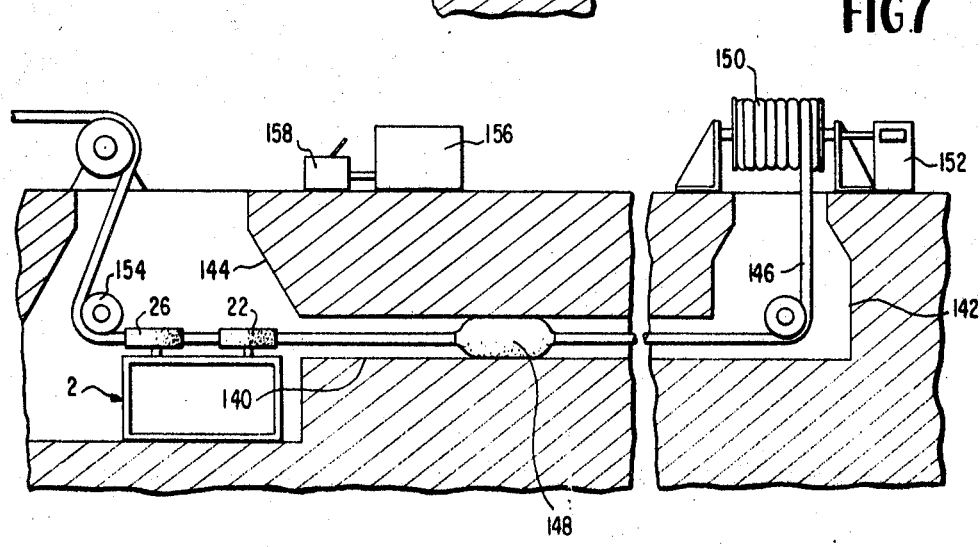
FIG. 7 is a schematic view of a subterranean conduit inspection system utilizing the apparatus of this invention.

Another installation in which the apparatus 2 may be utilized is illustrated schematically in FIG. 7. Underground sewer lines may be inspected and repaired by running a tool through the line. A sewer line 140 extends between manholes 142 and 144. A cable or conduit, to which an inspection or repair tool 148 is connected, is dispensed into the manhole 142 from a reel 150. The cable 146 is electrically connected to a television monitor set 152. The tool 148 may be of the type having a television camera which is in position to inspect the walls of the sewer line 140.

The apparatus 2 may be located at the bottom of the manhole 144 with the cable 146 passing between the wheels 20, 22, 24 and 26. The flexible tubes 110 may be used for guiding the cable to the supporting surface 6 of the apparatus 2, or they may be removed if there is insufficient space in the manhole to accommodate the tubes. The rollers 100 and 102 on the opposite ends of the frame may be sufficient for guiding the cable 146 between the wheels. An auxiliary pulley 154 may be provided for directing the cable upwardly out of the manhole 144. An hydraulic fluid pump 156 is positioned adjacent the top of the manhole 144 and a control valve 158 is connected with the motor 92 of the apparatus 2 by suitable conduits (not shown). The valve 158 controls the motor 92 for selectively turning the wheels 20, 22, 24 and 26 in either direction.

In operating the installation shown in FIG. 7, the apparatus 2 is lowered into the manhole 144 and the reel 150 is positioned over the other manhole 142. The cable 146 is run through the sewer line 140 and passes between the rollers 20, 22, 24 and 26. The spacing between the rollers may be adjusted to provide the necessary gripping action on the cable 146. By operating the valve 158, the wheels of the apparatus 2 turn and exert a thrust on the cable 146 to draw the cable and the tool 148 through the sewer line 140. The television monitor 152 may be operated continuously for reviewing the condition of the sewer line as the tool is moved along by the conveying apparatus 2.

The tires 114 effectively grip the surface of the hose 98 and apply a force to the hose in an axial direction. Since there are a plurality of tires 114, the axial force applied by the tires is distributed over a large portion of the hose surface and local stresses on the hose are minimized. Furthermore, the large area of contact between the hose and the tires permits the application of relatively large axial forces on the hose without spinning the tires relative to the hose.

It is apparent that the conveying apparatus of this invention may be readily transported from one location to another and may be used for applying an axial thrust to either flexible or rigid conduits for effectively conveying in either direction. The apparatus will accommodate conduits of widely varying sizes. The frictional force of the wheels on the conduit may be adjusted by means of the screw 58, but yet the transverse spring 50 provides limited variations in the separation between opposed wheels to allow couplings or collars to pass between the wheels without interrupting the axial thrust on the conduit.

The apparatus may be safely operated while high pressure fluids are being connected through the hose or conduit that is passing through the machine. The controls for the hydraulic motor 92 may be positioned remote from the machine, thereby allowing the machine to be placed in an inaccessible location, such as down a manhole. Although the operator is shielded while the machine is in use, it is not difficult to open the cover and insert or remove a hose or conduit between the wheels of the machine.

While this invention has been illustrated and described in one embodiment, it is recognized that variations and changes may be made therein without departing from the invention.

We claim:

1. Apparatus for conveying elongated articles comprising a frame, a plurality of wheels, means mounting said wheels for rotation on said frame in substantially the same median plane and about substantially parallel axes, said wheels being arranged in pairs having opposed resilient peripheral gripping surfaces, said wheel mounting means for one wheel of each of at least two adjacent pairs being secured on said frame, guide means on said frame, said wheel mounting means for the other wheel of said adjacent pairs being mounted in said guide means for movement toward and away from said one wheel of the respective pairs, spring means extending between said movable wheel mounting means of each of said adjacent pairs, said spring means biasing said movable wheel bearing means toward said one wheel of each of the respective pairs, means for adjusting the position of said spring means relative to said frame and thereby adjusting the bias of said spring means, and means for imparting rotation to said wheels, said spring means including an elongated spring, the opposite ends of said spring being connected with said movable wheels, said adjusting means including a bracket on said frame, a screw extending through said bracket and engaging said spring intermediate the ends thereof, whereby the spring bias is adjusted by turning said screw.

2. Apparatus for conveying elongated articles comprising a frame, a plurality of wheels, means mounting said wheels for rotation on said frame in substantially the same median plane and about substantially parallel axes, said wheels being arranged in pairs having opposed resilient peripheral gripping surfaces, said wheel mounting means for one wheel of each of at least two adjacent pairs being secured on said frame, guide means on said frame, said wheel mounting means for the other wheel of said adjacent pairs being mounted in said guide means for movement toward and away from said one wheel of the respective pairs, spring means extending between said movable wheel mounting means of each of said adjacent pairs, said spring means biasing said movable wheel bearing means toward said one wheel of each of the respective pairs, means for adjusting the position of said spring means relative to said frame and thereby adjusting the bias of said spring means, and means for imparting rotation to said wheels, said rotation imparting means including motor means on said frame, a first rotary shaft and a second rotary shaft, means connecting said first shaft to said one wheel of each of said pairs of wheels and said second shaft to said other wheel of said pairs of wheels, said motor means operating through said connecting means for driving said one wheel in one direction and said other wheel in the opposite direction, said connecting means including a first universal joint on said second shaft, a second universal joint on said other wheel shaft, a drive shaft operatively connected between said first and second joints, means for restricting rotation of said drive shaft relative to said joints while permitting axial displacement of said joints relative to said drive shaft, whereby the spacing between said wheels may be changed without interrupting the rotation of said wheels by said motor.

3. The apparatus according to claim 2 wherein said guide means includes means forming a slot in said frame, said first and second shafts extending through said slot, said one wheel mounting means being secured to said slot forming means, and said other wheel mounting means being movable along said slot.

4. The apparatus according to claim 3 including first drive means interconnecting said one wheel of each pair of wheels, and second drive means interconnecting said other wheel of each pair of wheels, whereby the second pair of wheels rotates concurrently with the first pair of wheels.

References Cited

UNITED STATES PATENTS

| | | | |
|---|---|---|---|
| 2,668,615 | 2/1954 | Sampatacos | 226—186 X |
| 2,670,926 | 3/1954 | Sewell | 226—186 |
| 1,821,664 | 9/1931 | Peiler | 226—189 X |
| 2,316,798 | 4/1943 | Luebbe | 226—181 X |
| 3,220,700 | 11/1965 | Comeau | 226—188 X |
| 3,239,120 | 3/1966 | Bosteels | 226—188 X |
| 3,331,545 | 7/1967 | Olivieri | 226—187 |

M. HENSON WOOD, Jr., Primary Examiner

RICHARD A. SCHACHER, Assistant Examiner

U.S. Cl. X.R.

226—188, 189